(12) United States Patent
Hughes

(10) Patent No.: US 7,306,120 B2
(45) Date of Patent: Dec. 11, 2007

(54) MEASURING CUP WITH VOLUME MARKINGS VISIBLE WHILE POURING

(75) Inventor: W. Scott Hughes, Chicago, IL (US)

(73) Assignee: Rubbermaid Incorporated, Wooster, OH (US)

( * ) Notice: Subject to any disclaimer, the term of this patent is extended or adjusted under 35 U.S.C. 154(b) by 422 days.

(21) Appl. No.: 10/891,669

(22) Filed: Jul. 15, 2004

(65) Prior Publication Data

US 2005/0029297 A1 Feb. 10, 2005

Related U.S. Application Data

(60) Provisional application No. 60/493,139, filed on Aug. 7, 2003.

(51) Int. Cl.
*B67D 5/38* (2006.01)
(52) U.S. Cl. ..................................... 222/158
(58) Field of Classification Search ............... 222/158, 222/159, 23–26; 33/1 V; 73/426–429; D10/46.3, D10/46.2
See application file for complete search history.

(56) References Cited

U.S. PATENT DOCUMENTS

| | | | | |
|---|---|---|---|---|
| 1,564,470 A | * | 12/1925 | Crimmel ..................... | 73/427 |
| 1,718,897 A | * | 6/1929 | Scholes et al. ............. | 222/158 |
| D211,047 S | * | 5/1968 | Johnson et al. ........... | D10/46.2 |
| D316,529 S | * | 4/1991 | Beckman, Sr. ............ | D10/46.2 |
| 5,235,853 A | * | 8/1993 | Froes .......................... | 73/427 |
| D339,991 S | * | 10/1993 | Mulry et al. ............... | D10/46.2 |
| 5,397,036 A | * | 3/1995 | Maiwald ...................... | 222/475 |
| 6,263,732 B1 | | 7/2001 | Hoeting et al. | |
| 6,543,284 B2 | * | 4/2003 | Hoeting et al. ............... | 73/427 |
| 6,769,302 B1 | * | 8/2004 | King et al. .................... | 73/427 |

FOREIGN PATENT DOCUMENTS

GB 2285509 * 7/1995 ................. 222/158

* cited by examiner

Primary Examiner—Lien M. Ngo
(74) Attorney, Agent, or Firm—Lempia Braidwood LLC

(57) ABSTRACT

An improved measuring cup is disclosed with volumetric indicia disposed on the inside of the cup that are viewable from above the cup, while the cup is disposed on a horizontal countertop or work surface. The horizontally upward facing volume indicia eliminate the need to raise the measuring cup to eye level to check the amount of material that has been added to the cup or the need to stoop down and view a side of the cup while the cup is disposed on a horizontal countertop or work surface. An improved handle is also disclosed which makes the cup more stable and less prone to being tipped over and spilled during use on a horizontal work surface.

18 Claims, 2 Drawing Sheets

MEASURING CUP WITH VOLUME MARKINGS VISIBLE WHILE POURING

CROSS-REFERENCE TO RELATED APPLICATION

This application claims the benefit under 35 U.S.C. § 119(e) of U.S. Provisional Patent Application Ser. No. 60/493,139, filed Aug. 7, 2003, the disclosure of which is incorporated herein by reference.

BACKGROUND

1. Technical Field

Improved measuring cups are disclosed. More specifically, improved measuring cups are disclosed which include volumetric markings visible from above the cup or from an elevated view or, visible while pouring liquid or solid material into or from the cup.

2. Description of the Related Art

Measuring cups are known. Conventionally, measuring cups include volume indicia marked along an exterior side of the cup. However, this marking system is inconvenient when the cook is attempting to pour partial amounts of material from the cup or, when the cook is attempting to only partially fill the cup. For example, to accurately place one quarter cup of material in a measuring cup having a total volume of two cups, the cook must either bend down to the countertop or work surface to view the level of material in the cup and the volume indicia as the cup is being partially filled or, the cook must hold the measuring cup at eye level while partially filling the cup. In either instance, achieving an accurate volume of material in a measuring cup can be uncomfortable as well as time consuming. This problem is exacerbated when the cup is fabricated from an opaque material.

Other known measuring cups have volume indicia on the inside surface of the measuring cup. However, because these indicia are on the vertical wall of the cup, they are difficult to read from a normal, standing position, while the measuring cup is on the countertop or work surface. Again, to accurately view the desired volume marking, the cook must bend over and get his/her eyes closer to the cup or closer to the surface of the countertop. Also, if the cup is made from an opaque material, the indicia can be very hard to read.

One solution to this problem is provided in U.S. Pat. No. 6,263,732 which discloses a measuring cup with a sloped ramp disposed along the interior surface of the vertical wall of the cup. The sloped ramp has volume indicia spaced apart along the ramp. However, these indicia are difficult to read and because each volume indicia is a single line on a relatively narrow ramp and, as a result, it is difficult to accurately fill the cup with the volume of material desired.

Therefore, there is need for an improved measuring cup which provides volume indicia that are easily seen from an elevated view, above the cup, while the cup is resting on a countertop or work surface.

In satisfaction of the aforenoted needs, an improved measuring is disclosed which comprises a bottom wall connected to at least three sidewalls which, in turn, are connected together to form an open top and at least three corners. One of the corners forms a spout and at least one of the other corners is connected to a plurality of vertically spaced apart steps disposed inside the cup. Each step has a top generally horizontal surface and the generally horizontal surfaces of each step are marked with volumetric indicia. In this way, as the user fills the with material, either liquid or solid, the user is confident that the correct volume has been achieved when the volumetric indicia disposed on the horizontal surface of the selected step begins to be covered with material.

In a refinement, at least one exterior surface of the one of the sidewalls is also marked with volumetric indicia. In such an embodiment, it is preferable that the cup be fabricated from a clear material, such as clear plastic.

In another refinement, one of the sidewalls, preferably the sidewall disposed opposite the spout, is connected to a handle. In a further refinement, the handle extends downward far enough so that a distal end of the handle is generally parallel with the bottom wall of the cup. In this way, the handle adds to the stability of the cup when it is disposed on a horizontal work surface.

Preferably, in a three-cornered cup design, at least two other corners include steps marked with volumetric indicia. Alternatively, all three corners, including the corner that forms the spout, can include steps marked with volumetric indicia. Further, alternative embodiments such as four-cornered cups, with three or more of the corners including steps marked with volumetric indicia, can be provided.

Preferably, the handle includes a polymeric gripping member for ease of handling.

BRIEF DESCRIPTION OF THE DRAWINGS

Features and advantages of the disclosed embodiments will become apparent from reading the following detailed description in conjunction with the accompanied drawings, wherein.

DETAILED DESCRIPTION OF THE PRESENTLY PREFERRED EMBODIMENTS

Figure 2:
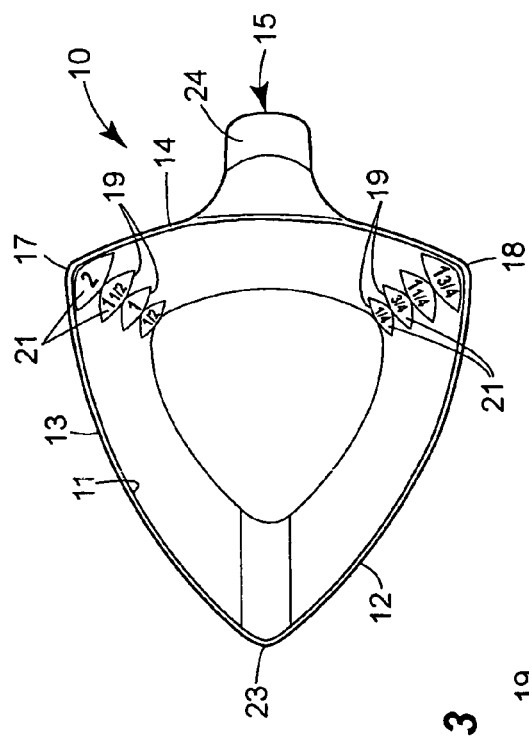
FIG. 2 is a top plan view of the measuring cup shown in FIG. 1.
Figure 3:
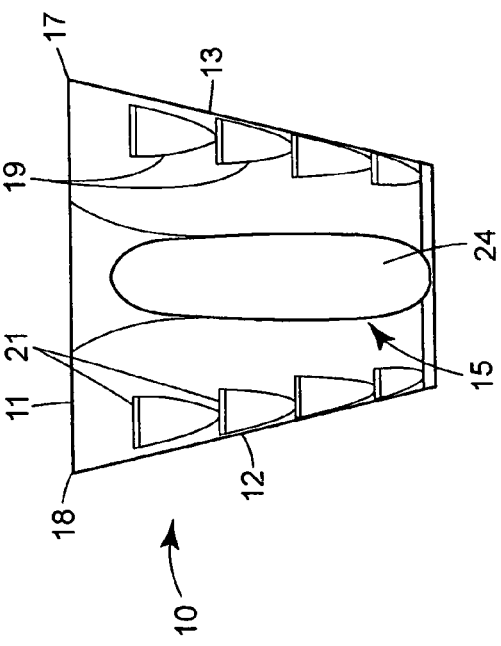
FIG. 3 is an end plan view of the measuring cup shown in FIGS. 1 and 2.
Figure 1:
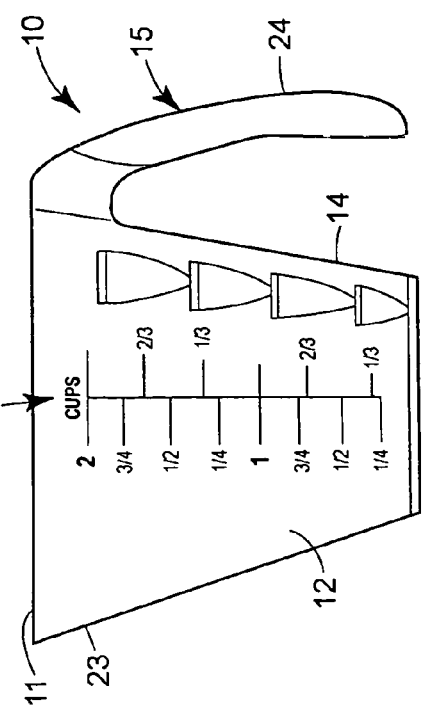
FIG. 1 is a side plan view of an improved measuring cup in accordance with this disclosure.

Referring to FIGS. 1-3, an improved measuring cup 10 is disclosed having an open top 11, sidewalls 12, 13 and an end wall 14. The end wall 14 is connected to a handle 15 which, in the embodiment shown in FIGS. 1-3, is long enough so that its distal end 28 provides an additional supporting point for the cup 10 when the cup 10 was placed on a horizontal countertop or work surface. Thus, the handle 15 provides added stability for the cup 10. At least one of the sidewalls 12 includes a plurality of measuring indicia shown at 16. In addition to the measuring indicia 16 disposed on an exterior surface of the sidewall 12, the interior of the measuring cup 10 also includes a plurality of measuring indicia.

Specifically, referring to FIG. 2, the corners 17, 18 include a plurality of steps shown generally at 19, each of which includes a horizontal, upwardly facing surface 21. The horizontal surfaces 21 are each marked with a volume indicia as shown in FIG. 2.

Thus, to fill the cup 10 in an accurate, partial-fill amount, such as one quarter, one half, three fourth, one, one and one quarter, one and one half, one and three quarter or two cups, all the cook needs to do is place the cup 10 on a horizontal work surface, and fill the cup 10, looking from above until the indicia for the desired volume metric amount begins to be covered with the material, which may either be in liquid or powdered form. Thus, the cook does not need to bend down and view the cup 10 from the side or otherwise lower his/her head to the level of the countertop or work surface.

The embodiment shown in FIGS. 1-3 is directed toward English units; however, the design disclosed is also applicable to metric units as well. Further, an additional series of steps may be provided along the front corner 23 which forms the spout. This corner could be used for the one third/two third cup increments that are provided on the sidewall of 12 as shown in FIG. 1. Further, while the cup 10 has a rounded triangular shape, cups of other shapes, such as round or square may also be utilized. It is preferred that the cup includes a convenient pouring spout as provided by the corner 23 (see FIG. 2). Finally, the handle 15 is preferably covered with a rubber or other polymer coating 24 for gripping purposes.

Figure 5:
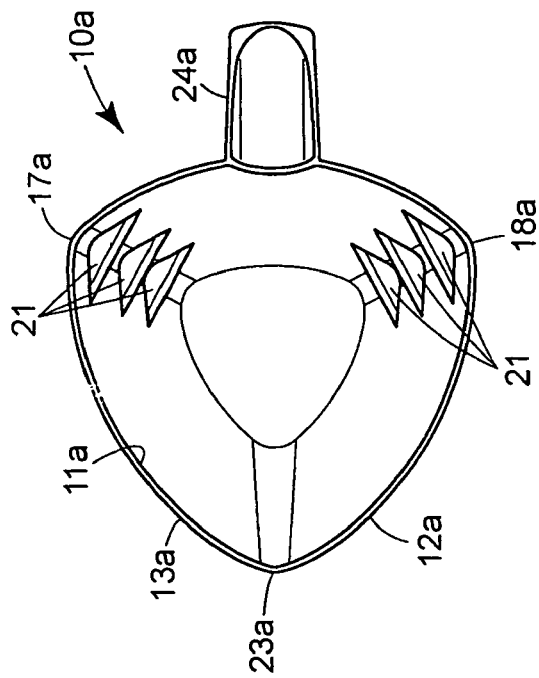
FIG. 5 is a top plan view of the measuring cup shown in FIG. 4.
Figure 4:
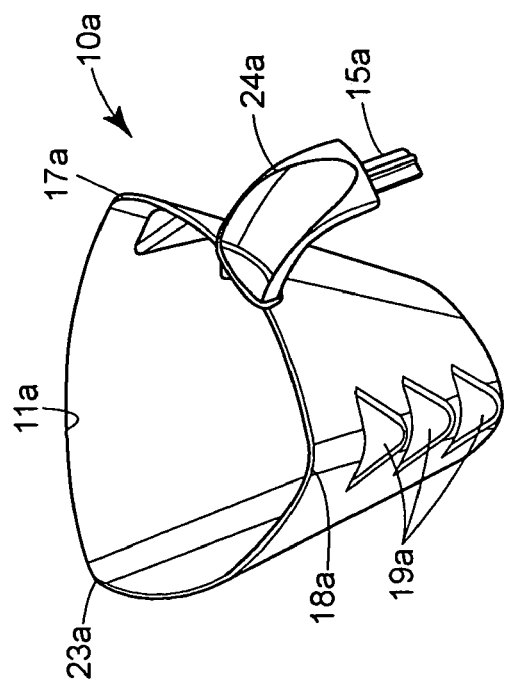
FIG. 4 is a top perspective view of another measuring cup made in accordance with this disclosure.
Figure 6:
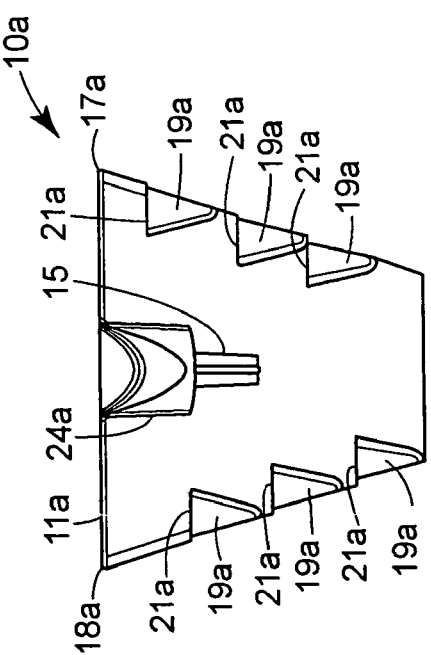
FIG. 6 is an end or side plan view of the measuring cup shown in FIGS. 4 and 5.

Turning to FIGS. 4-6, an additional embodiment 10a is disclosed with a shorter handle 15, but which is equipped with a shaped thumb grip 24a. The handle 15 can be equipped with an extension like that shown at 24 in FIGS. 1-3 to provide easier handling and improved stability when placed on a horizontal work surface. Again, view the cup 10a from above the open mouth 11a as shown in FIG. 5, the plurality of horizontal surfaces 21 is easily visible from above the cup 10a. Thus, all the consumer needs to do is fill the cup 10a to the desired level (i.e. one of the horizontal surfaces 21) while viewing the cup 10a from the prospective similar to that of FIG. 5. While the embodiment shown in FIGS. 4-6 include the rounded triangular shape similar to that shown for the embodiment in FIGS. 1-3, other shapes can be utilized. Further, more than two sets of horizontal surfaces 21 or steps may be provided. Both embodiments 10, 10a are adaptable for English units as well as metric units.

Although certain embodiments have been described here, the scope and coverage of this disclosure and subsequent patent is not limited thereto. In the contrary, this disclosure and subsequent patent covers all embodiments of the teachings of this disclosure that fairly fall within the scope of permissible equivalence.

The invention claimed is:

1. A measuring cup comprising:
    a bottom wall connected to at least one sidewall forming an open top, the at least one sidewall further comprising at least three sidewalls defining corners therebetween, and wherein at least two of said corners are connected a plurality of vertically spaced apart steps disposed inside the cup with each step having a top horizontal surface marked with volumetric indicia
    a handle extending from the side wall
    a spout at the side wall and disposed substantially opposite the handle,
    the plurality of vertically spaced apart steps disposed inside the cup and located between the handle and the spout.

2. The cup of claim 1 wherein an exterior surface of the sidewall is marked with volumetric indicia.

3. The cup of claim 1 wherein the handle extends downward so that a distal end of the handle is generally parallel to the bottom wall of the cup.

4. The cup of claim 1, further comprising a second plurality of vertically spaced apart steps disposed inside the cup and located substantially opposite the other plurality of vertically spaced apart steps.

5. The cup of claim 1, wherein one of the corners provides a spout and the handle is disposed at one of the sidewalls disposed opposite the spout.

6. The cup of claim 5, wherein the plurality of steps is disposed at one of the corners that does not serve as the spout, the cup further comprising a second plurality of vertically spaced apart steps disposed inside the cup and located at a different corner that des not serve as the spout, wherein each step of the second plurality of steps has a top horizontal surface marked with volumetric indicia.

7. The cup of claim 6 wherein an exterior surface of one of the sidewalls that is not connected to the handle is marked with volumetric indicia.

8. The cup of claim 6 wherein exterior surfaces of both sidewalls that form the corner that serves as the spout are marked with volumetric indicia.

9. The cup of claim 1, wherein the handle comprises a polymeric gripping member.

10. A measuring cup comprising:
    a bottom wall connected to three sidewalls connected together to form an open top and a first corner, a second corner, and a third corner,
    the first corner forming a spout,
    a first plurality of vertically spaced apart steps disposed inside the cup and positioned at the second corner;
    a second plurality of vertically spaced apart steps disposed inside the cup and positioned at the third corner,
    each step having a top horizontal surface, the horizontal surfaces of the steps being marked with volumetric indicia.

11. The cup of claim 10 wherein an exterior surface of one of the sidewalls is marked with volumetric indicia.

12. The cup of claim 10, further comprising a handle located at one of the sidewalls that is disposed opposite the spout, the handle extending downward so that a distal end of the handle is generally parallel to the bottom wall of the cup.

13. The cup of claim 10 wherein all three corners are connected a plurality of vertically spaced apart steps disposed inside the cup with each step having a top horizontal surface marked with volumetric indicia.

14. The cup of claim 10 wherein exterior surfaces of both sidewalls that form the corner that serves as the spout are marked with volumetric indicia.

15. The cup of claim 10 wherein the handle comprises a polymeric gripping member.

16. A measuring cup comprising:
    a bottom wall connected to three sidewalls connected together to form and open top and three corners,
    one of the corners forming a spout,
    two of the other corners being connected to a plurality of vertically spaced apart steps disposed inside the cup,
    each step having a top horizontal surface, the horizontal surfaces of the steps being marked with volumetric indicia,
    a handle located at one of the sidewalls that is disposed opposite the spout, the handle extending downward so that a distal end of the handle is generally parallel to the bottom wall of the cup,
    wherein the two sidewalls that form the spout are marked with volumetric indicia on exterior surfaces thereof.

17. The cup of claim 16 wherein all three corners arc connected a plurality of vertically spaced apart steps disposed inside the cup with each step having a top horizontal surface marked with volumetric indicia.

18. The cup of claim 16 wherein the handle comprises a polymeric gripping member.

* * * * *

UNITED STATES PATENT AND TRADEMARK OFFICE
CERTIFICATE OF CORRECTION

PATENT NO. : 7,306,120 B2 Page 1 of 1
APPLICATION NO. : 10/891669
DATED : December 11, 2007
INVENTOR(S) : W. Scott Hughes It is certified that error appears in the above-identified patent and that said Letters Patent is hereby corrected as shown below:

In the claims:
Column 4
claim 17, line 60, please delete "arc" and replace with -- are --

Signed and Sealed this

Sixth Day of May, 2008

JON W. DUDAS
*Director of the United States Patent and Trademark Office*